United States Patent [19]

Murphey

[11] 4,199,484

[45] Apr. 22, 1980

[54] GELLED WATER EPOXY SAND CONSOLIDATION SYSTEM

[75] Inventor: Joseph R. Murphey, Duncan, Okla.

[73] Assignee: Halliburton Company, Duncan, Okla.

[21] Appl. No.: 840,083

[22] Filed: Oct. 6, 1977

[51] Int. Cl.² .................. C08L 1/26; C08L 1/28; C08L 1/10
[52] U.S. Cl. .................. 260/13; 252/8.55 R; 252/316; 260/9; 427/221; 428/407
[58] Field of Search .............. 260/9, 13; 252/8.55 R, 252/316; 428/407

[56] References Cited

U.S. PATENT DOCUMENTS

| | | | |
|---|---|---|---|
| 3,100,527 | 8/1963 | Hilton et al. | 166/33 |
| 3,621,915 | 11/1971 | Bruist et al. | 166/276 |
| 3,719,663 | 3/1973 | Klug | 260/231 R |
| 3,727,688 | 4/1973 | Clampitt | 252/8.55 R X |
| 3,776,311 | 12/1973 | Carnes et al. | 166/295 |
| 3,798,191 | 3/1974 | Donnelly | 260/13 |
| 3,827,898 | 8/1974 | Podlas | 106/194 |
| 3,898,165 | 8/1975 | Ely et al. | 252/8.55 R |
| 4,000,781 | 1/1977 | Knapp | 166/276 |
| 4,021,355 | 5/1977 | Holtmyer et al. | 252/316 X |
| 4,042,032 | 8/1977 | Anderson et al. | 166/276 |
| 4,074,760 | 2/1978 | Copeland et al. | 260/29.2 EP |

OTHER PUBLICATIONS

Michaels, *Ind. & Engr. Chem.*, vol. 52(9), Sep. 1960, pp. 785-788.
Lybarger et al., *SPE 4774, SPE of AIME*, New Orleans, La., Feb. 7-8, 1974.
Knapp et al., *SPE 6177, SPE of AIME*, New Orleans, La., Oct. 3-6, 1976.

*Primary Examiner*—Walter C. Danison
*Attorney, Agent, or Firm*—Robert S. Nisbett; John H. Tregoning; Thomas R. Weaver

[57] ABSTRACT

Particular aqueous gels, epoxy resin compositions and optional additives such as diluents, retarders and accelerators are described which produce a practical composition and method for in situ sand consolidation and gravel packing by which a resin coated sand is positioned in a desired location and cured by an internal catalyst to form a porous permeable or plugged consolidated mass.

21 Claims, No Drawings

GELLED WATER EPOXY SAND CONSOLIDATION SYSTEM

In the control of sand in oil wells, one method used is to place a portion of graded sand or pack sand against the formation sand, thus forming a filter pack holding the formation sand in place. This pack sand can be consolidated by coating the sand with a resin formulation such as a preferred epoxy resin composition. The pack sand and formation sand can also be coated with the resin composition in situ in which case the coating can be controlled to form an impermeable plugged formation or to produce a porous permeable consolidation. Such sand packs and in situ consolidations have been applied using hydrocarbon carriers which present numerous problems with safety, cost and environmental protection. By this invention is provided a method for forming a consolidated pack or a gravel pack of sand coated with a preferred epoxy resin composition. For the gravel pack, the sand is suspended in a viscous gelled water and coated with the epoxy resin composition in the presence of the gelled water which is then used to transport and place the coated sand to the desired location and to hold the coated sand in place while the resin becomes tacky and consolidates into a porous permeable high strength consolidated pack. Setting of the epoxy resin composition can be controlled by accelerators or retarders to give the desired working and consolidation time. Preferably the aqueous gel is broken after, or as close to as possible, the placement of the coated sand at the desired location. In some cases this may be just before placement. This assures initmate contact of the coated sand particles and allows the aqueous fluid to separate from the sand to enter the formation or return to the surface through the well as desired.

The aqueous gels used with the method and compositions of this invention are gels of either fresh water, brine or sea water using as a gelling agent a neutral or nonionic polysaccharide polymer having a molecular weight in the range of about 100,000 to 2,00,000 which is at least partially water soluble. The polymer is preferably a cellulose or guar derivative with substituents such as ethylene oxide to give the necessary water solubility and gel characteristics to produce a clear aqueous gel having a viscosity of at least about 30 centipoise. The preferred polymers include substituted hydroxy alkyl cellulose such as hydroxyethylcellulose (HEC) having an ethylene oxide substituent ratio of about 1.0 to 3.0.

A preferred class of viscosifiers for the high viscosity fluid of this invention is the water soluble polysaccharides and especially the substituted nonionic cellulose polymers, such as hydroxy alkyl cellulose or cellulose ethers in which the alkyl groups have 2-3 carbon atoms. Other substituents can be present or used which produce a water soluble cellulose which does not adversely react in the high density fluid system. The substituted cellulose should be hydratable in the high density fluid. The preferred cellulose class can be represented as a series of anhydroglucose units shown as follows:

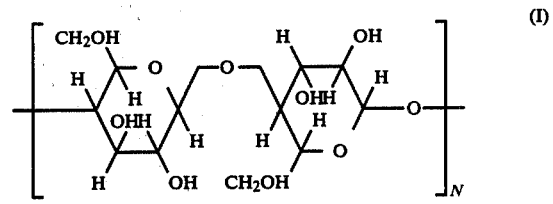

The portion in brackets is two anhydroglucose units, each having three reactive hydroxyl groups. N is an integer which would give the desired polymer molecule length and preferably an aqueous viscosity of about 105–130 viscosity units of consistency at 72° F. (approximately equal to centipoise [cp]) on a V.G. Meter at 300 RPM with a 1% solution in fresh water.

When the cellulose polymer is treated with sodium hydroxide and reacted with ethylene oxide, an ether substituted cellulose such as hydroxyethyl ether or hydroxyethylcellulose is produced shown as follows:

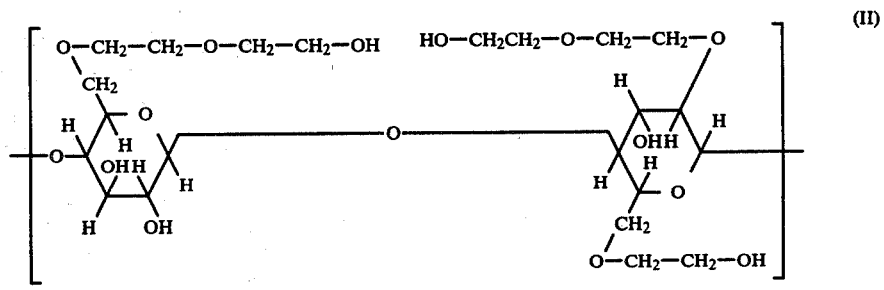

The hydroxyethylcellulose or HEC shown has three of the six hydroxyl groups substituted by ethylene oxide; therefore the degree of substituted (or D.S.) is 3 of 6 or 1.5 per anhydroglucose unit. The preferred D.S. for cellulose polymer viscosifiers of this invention is about 1.0–3.0.

The above formula also shows that two of the substituted hydroxyl groups have two moles of ethylene oxide and one has one mole of ethylene oxide; therefore, the ratio of moles of ethylene oxide to anhydroglucose unit (or M.S.) ratio is 5 moles for two units of 2.5. The preferred M.S. ratio for HEC polymer viscosifiers of this invention is 1.5–3.0.

Thus, the preferred class of cellulose ether polymers can have various polymer lengths, degrees of substitution and lengths of side chains. Since these factors are interrelated the preferred polymers can be readily defined by viscosity in aqueous solutions.

The viscosity measurement and sample preparation must be carefully controlled. The viscosity measurement must be standardized because the viscosity reading is dependent upon rate of shear, temperature, amount of agitation prior to measurement and elapsed time between agitation and measurement. The sample must be completely dissolved and a moisture correction included. Samples are dried by heating in a correction oven at a constant temperature of about 105°±0.5% C. for 3 hours. The samples are cooled in a desiccator and weighed at ambient temperature. The heating for about 45 minutes and cooling are repeated until repeated weights are within about 5 milligrams per each 5 grams of sample. The amount of moisture in the samples is used to calculate solution concentration of remaining portions of the cellulose polymer. The polymer solution and samples for moisture determination should be prepared at the same time to insure correspondense between the moisture correction and samples used for solution preparation. An estimated amount of polymer to prepare the desired concentration and amount of polymer solution should be weighed and stored in a moisture tight container. After the moisture correction factor is applied and the exact amount of water required is determined, the water and polymer should be carefully mixed with slow agitation. After the polymer appears to be completely dissolved, the solution should be vigorously agitated for 10–15 minutes. For viscosity measurement the solution should be at a constant temperature of 25°±0.5° C. for at least 30 minutes but the viscosity must be measured within two hours of the vigorous agitation, or the solution should be vigorously re-agitated for ten minutes and held at a constant 25° C. for 30 minutes before measurement.

Since the neutral polysaccharide polymers used to gel the aqueous medium for the compositions of this invention compete with the epoxy resin compositions in absorbing on the sand or particulate matter surfaces of the pack sand or formation, it is necessary to control the surfactant characteristics of the epoxy resin composition and the various additives used in the compositions of this invention. In other words, the various absorptive strengths and coating strengths of the gelling polymer and epoxy resin composition must be balanced and controlled to produce the desired absorption of the resin composition onto the sand and the desired coating of the sand in the presence of the aqueous gel and other additives necessary to produce the porous permeable consolidated pack.

The gelled polymer not only competes with the resin composition in adsorbing onto the sand surfaces but also forms a protective layer around the resin coated sand particles. Thus, it is desirable to break the aqueous gel prior to consolidating the resin coated particles to allow more intimate association of the resin coated particles prior to consolidation, thereby forming a higher strength consolidated pack. The aqueous gel must maintain its gel character or viscosity until the dispersed resin or resin coated sand particles are at or near the desired location for consolidation. In order to do this the aqueous gel is broken by a delayed mechanism. This is done by using a latent breaker system and optionally increasing the resin working time by using acid or acid generating materials such as acetic acid for longer working times or high temperature applications. For low temperature applications, an oxidative accelerator such as a water soluble organic or inorganic salt capable of supplying cupric ion can be used in conjunction with an amine surfactant. For latent breaking of the aqueous gel the preferred breakers are low molecular weight water soluble peroxide or hydroperoxide compounds, or enzyme breakers which oxidize polysaccharide linkages. The acid generating materials used as breakers will generally work better under conditions of a pH of less than about 6 and preferably less than about 4. The preferred enzyme breakers are pH sensitive and have an upper temperature limit of about 140° F. Conventional breakers for polysaccharides such as inorganic peroxides including sodium persulfate (SP) and ammonium persulfate (AP) cannot be used since the persulfates and peroxides are incompatible with the preferred resin amine curing agents and other additives which might be used in the aqueous gel such as bromide ion, and some aromatic amines used as carrying agents or surfactants. The preferred ambient or high temperature breakers are the organic hydroperoxides such as tert-butylhydroperoxide (TBH) and other low molecular weight water soluble alkyl hydroperoxides. The gels themselves are also quite sensitive to variations in pH and their characteristics before breaking are dependent upon the pH. Therefore, some efforts to control the pH within the range of about 3–8 and preferably about 5–7.5 should be made.

Thus by this invention there is provided methods and compositions for coating onto sand or particulate material in the presence of an aqueous gel an unset epoxy resin composition. This coating can be done in situ in the formation or by suspending the resin or the sand in the aqueous gel and merely mixing the particular composition components prior to placing the resin coated sand in the desired location and quantities using the aqueous gel as a carrier fluid and consolidating the resin coated sand in place. The epoxy resin composition dispersed in aqueous gel can be used to treat formations forming an impermeable plug or consolidating the formation into a porous permeable zone within the formation. As pointed out above, a problem common to both concepts is the coating and incompatibility of the conventional oxidative or acidic gel breakers with the conventional epoxy resin hardners (usually amines). The oxidizing agents in such cases are usually spent or consumed in oxidizing the amine hardners rather than oxidizing the polysaccharide polymers forming the aqueous gel. The acidic agents are ordinarily acidic enough to salt out or water solublize the amine hardners and other additives commonly used with epoxy resin compositions.

Thus it has been found that the use of particular breaking systems which employ an organic hydroperoxide, an amine surfactant and a cupric salt provide a breaking mechanism which is compatible with the particular resin compositions and coating agents required to coat the resin onto the sand particles in the presence of the aqueous gel. In other words, the preferred breaker system can oxidize the reducible sugar or polysaccharide gel polymers in the presence of the epoxy resin, the epoxy hardners, and other additives at ambient and low temperatures without appreciably oxidizing the amine hardners required to set the epoxy resin composition. In addition, the preferred amine type epoxy resin curing compositions can be delayed at temperatures of about 150°–180° F. to provide adequate working and placement times for mixing and pumping the composition into the desired location. Thus by this invention there is provided in an epoxy resin composition for forming a porous permeable consolidated particulate mass, the composition characterized as an aqueous gel with a neutral polysaccharide polymer producing a viscosity of at least about 30 centipoise containing a mixture of surfactants comprising at least one cationic surfactant with limited water solubility and at least one noncationic water miscible surfactant which mixture causes the epoxy resin composition to absorb onto and coat the surfaces of the particulate material in the presence of the aqueous polysaccharide polymer gel. The preferred epoxy resin composition comprises a polymerizable epoxide, an optional organic diluent and an amine type curing agent. The epoxy resin composition also preferably contains an amine type cationic surfactant which promotes adsorption of the resin onto the surfaces and aids in curing the epoxy resin. The epoxy resin composition can optionally also contain a retarder and/or a silane type coupling agent. The aqueous gel containing the dispersed resin composition or dispersed resin coated sand would also preferably contain a gel breaker system such as a glucoside oxidizing enzyme, an organic $C_2$-$C_8$ alkyl tertiary hydroperoxide, and optionally a water soluble salt capable of producing a cupric ion accelerator. The cupric salt can be any water soluble inorganic salt or low molecular weight organic hydrocarbon (e.g. $C_1$-$C_8$) compound capable of supplying the cupric ion.

A preferred process of this invention comprises the mixing of a neutral polysaccharide polymer such as substituted cellulose or quar gum (e.g. about 1% by weight of an uncrosslinked polymer or less with a crosslinked polymer) with an aqueous fluid either fresh water brine or salt water to gel the aqueous fluid and thereby increasing the viscosity to at least about 30 centipoise and preferably a viscosity in the range of about 60 to 160 centipoise (i.e. reading on V.G. Meter at 300 RPM). To this mixture of aqueous fluid and neutral polymer a blend of surfactants is added. This blend or mixture of surfactants comprises at least one cationic surfactant with limited water solubility and at least one water miscible surfactant which is not cationic. The noncationic surfactant can be either nonionic, anionic or a mixture thereof. It may be a weakly ionized salt of the cationic surfactant and a weak organic acid such that the salt is not hydrolyzed in the carrier fluid, e.g. salicyclic, oxalic, maleic and citric. The noncationic surfactant should be present in an amount of at least about 10% of said surfactant mixture. The cationic, nonionic and anionic surfactants are normally liquid, synthetic or naturally occurring surfactants which can contain alkyl, aryl, hetero and unsaturated radicals or groups which contain about 8 to 18 carbon atoms per radical. In addition, these surfactants can contain substituent groups such as hydroxyl, carboxyl, sulfonyl, amine and other substituent groups to control the hydrophilic-hydrophobic balance of the surfactant within the HLB range of about 3 to 8. The HLB balance is defined in EMULSIONS, THEORY AND PRACTICE, by Paul Becher, Reinhold Publishing Corp., 1957, pp 233-253, which is incorporated herein by reference. After the surfactant blend is added to the aqueous fluid containing the neutral polymer, either the particulate matter to be coated or the epoxy resin composition can be dispersed sequentially in the aqueous fluid. For in situ consolidations or plugging of the formation, only the epoxy resin composition will be dispersed in the aqueous fluid. However, for gravel packs the particulate material will be added first and thoroughly mixed with the aqueous fluid which should have a viscosity sufficient to suspend the particulate yet allow thorough mixing of the fluid. The preferred range of graded sand particle size for gravel packs is about 4-80 mesh (U.S. Std. Sieve Series) in which the smallest sand is not less than one-third mesh size of the largest mesh size (e.g., 4-12, 10-30, 40-80, etc.). After the sand is thoroughly dispersed within the aqueous fluid, the epoxy resin composition is then uniformly blended with the aqueous fluid and uniformly coated onto the sand particles suspended in the gelled aqueous fluid by mixing in the presence of said mixture of surfactants. As discussed herein the epoxy resin composition also contains the surfactant blend to promote uniform adsorption and coating of the silica surfaces of the suspended sand particles. This will usually be the same surfactant blend. In a preferred process of this invention the neutral polymer is a polysaccharide having a molecular weight in the range of about 100,000 to 2,000,000 and preferably in the range of about 500,000 to 1,200,000. In this preferred process the pH of the aqueous fluid is controlled to allow easy uniform mixing of the polymer with the aqueous fluid. The viscosity increases gradually to promote uniform mixing yet provide the viscosity necessary to suspend the silica particles and the epoxy resin compositions as they are added.

After the sand particles and epoxy resin composition are thoroughly mixed with the gelled aqueous fluid a breaker composition is added. The total mixture is pumped into the desired location either behind perforations or in a cavity or void space adjacent the well bore and formation to be consolidated. The gel breaking mechanisms should be timed according to the working time and temperature requirements so that the aqueous gel breaks immediately after reaching the desired location where the resin coated sand is to be deposited. This breaking of the aqueous gel immediately after placement aids in separating the aqueous fluid from the resin coated sand thereby permitting easy removal of the aqueous fluid either through or around tubing in the well or by forcing the aqueous fluid into the formation. Breaking of the aqueous gel immediately after placement also permits the resin coated sand particles to pack in close proximity and tightly against each other in the formation to form a stronger permeable porous pack. Setting of the epoxy resin composition should also be timed so that the epoxy resin becomes tacky after the gravel or sand particles are placed in the desired location and forced together in a tight pack so that the coated sand grains will have maximum contact when the resin becomes tacky and begins to set thereby producing a stronger permeable porous pack.

A most significant factor in the process and compositions of this invention is the ability to coat the suspended or in situ sand particles with an epoxy resin composition in the presence of a gelled aqueous fluid containing a neutral polymer gelling agent such as a polysaccharide as illustrated by a substituted hydroxyethylcellulose polymer or a substituted quar gum polymer. This is accomplished by the particular composition which balances the adsorption and coating characteristics of the epoxy resin composition as compared to that of the polymer gelling agent. This is especially significant since either a fresh water, brine or sea water aqueous phase can be used. While the pH should be adjusted within the range of about 4-7 depending upon the surfactants, epoxy curing agents and breaker systems used, which also depends on the temperature, the process and compositions are generally insensitive to variations in pH, temperature and contaminants within the given ranges. The ability to absorp and coat the sand particles with epoxy resin in the presence of the polymer gels also makes it possible to provide the necessary working time and place the resin coated particles in the same fluid in which the sand particles are coated. Additional advantages are also possible due to the control of the breaking time of the aqueous gel and the setting time of the epoxy resin composition. Controlling these factors makes it possible to form the consolidated annular zone or gravel pack in a very short time and to cure the resin within the period of time of less than 24 hours, thereby requiring a very short shut in time. The epoxy resin acquires substantial strength rapidly within a period of about less than 12 hours and about 80% of it consolidation strength within about 24 hours, thereby producing a simple yet fast and efficient consolidation and gravel method, composition and technique. With the compositions and processes of this invention, most conventional additives and conventional process steps can be used. As pointed out before, an emulsion of the epoxy resin composition and the gelled aqueous fluid should be avoided since this prevents effective coating and placement of the epoxy resin composition or epoxy coated sand particles in the gelled aqueous fluid. It may be desirable to use a preflush to condition the formation for in situ consolidation or to condition the formation adjacent a gravel pack to prevent contamination, maintain maximum permeability or treat the formation particles so that any access resin flushed through the formation will either not absorb or absorb to the extent desired to produce the desired permeability. Likewise, afterflushes may be used to insure uniform placement, consolidation and maximum permeability of the pack and formation being treated.

The preferred neutral polymers or gelling agents for the aqueous fluids of this invention are neutral polysaccharide polymers having a molecular weight in the range of about 100,000 to 2,000,000 and preferably about 500,000 to 1,200,000. These gelling agents should have a degree of substitution to produce the desired water solubility and gelling effect to produce a gelled aqueous fluid having a viscosity of at least 30 cps and preferably in the range of about 60 to 180 cps. Suitable gelling agents are described in the prior art cited and incorporated herein by reference and these gelling agents can be selected and used in view of this disclosure. Particularly preferred gelling agents include the classes of ethylene oxide substituted hydroxyethylcellulose polymers having a degree of substitution in the range of about 1.5 to 3.5. A polymer must be soluble in an aqueous phase to some extent in order to produce the desired gelling effect. The amount of polymer, the degree of substitution and the particular polymer selected will vary with the aqueous fluid, the application parameters and the other additives selected.

Likewise, the optimum blend of surfactants for adsorption and coating of the epxoy resin onto silica surfaces will vary with the application parameter such as pH, temperature and other components present. However, the preferred surfactants are primarily linear having a molecular weight of about 160 to 600 and containing alkyl, aryl, hetero and unsaturated groups of radicals wherein each group or radical contains about 2 to 12 carbon atoms. The amine quaternary type cationic surfactants are preferred for the major portion of the surfactant blend used to control adsorption and coating of the epoxy resin. The noncationic surfactant can also be an amine type surfactant but should be anionic or nonionic in overall character. It should be water miscible at ambient temperatures. This blend of cationic with a minor portion of noncationic surfactant can be varied depending upon the gelling polymer and the aqueous fluid selected. The aqueous fluid can be selected from distilled water, tap water, brine or sea water according to availability. Each of the components should be tested with the entire system and parameter selected for compatibility.

For gravel packs, the sand particles used should be carefully graded as to size with all interfering contaminants removed. The preferred size would be in the range of about 10-60 U.S. mesh series with the preferred sizes being 10-20, 20-40 or 40-60, which is selected to closely match the formation particle size and distribution next to which the pack is to be placed.

The epoxy resin composition for use with this invention contains an epoxy resin with a hardening agent. The preferred class of epoxy resin is a polyepoxide type with an amine type hardner as described herein. The amine hardner can also serve as a surfactant or even a cationic surfactant which aids in coating epoxy onto the silica surfaces. However, this is generally not the case. Optional components include diluents, retarders or accelerators. The preferred diluents are hydrocarbons or substituted hydrocarbons in which the epoxy resin is soluble and which are at least partially soluble in water. A preferred class of diluents are the esters such as ethyl acetate, methyl formate, ethyl glycol acetate and other normally liquid low molecular weight esters and ethers including the ethers of ethylene glycol. Esters containing alkyl or aryl groups having about 2 to 18 carbon atoms per radical are preferred. For high temperature applications, the substituted esters having higher boiling points and slower rates of hydrolysis are preferred. The retarders used in the epoxy composition of this invention are acid or acid producing compositions, some of which can also serve as diluents. The retarders should also be at least partially soluble in water and soluble in the epoxy resin composition. The retarder should be selected to produce the desired rate of hydrolysis or acid production according to the temperature and working times desired. The low molecular weight organic acid retarders are preferably produced by hydrolysis of an organic compound having a hydrolysis constant of about $K\ 4 \times 10^{-5}$. The acid produced by hydrolysis should have at least two carbon atoms such as 2-5 carbon atoms and preferably 2-3 carbon atoms. The other half of the organic compound (i.e., ester or ether) should not interfere with the coating or setting of the resin and preferably acts as a diluent for the resin. The other half of the hydrolysis product can have up to 18 carbon atoms. The accelerators used with the composition of this invention are weak organic acids with additional water soluble components. These water soluble compounds can be low molecular weight inorganic or organic salts containing about 2 to 18 carbon atoms which are water soluble and readily dispersed in the gelled aqueous fluid and are also at least partially soluble in the epoxy resin composition. Examples of the diluents include ethyl acetate, ethylene glycol monoalkyl ether ($C_1$-$C_4$), acetone and $C_2$-$C_4$ ketones. Examples of the hardening agents include most conventional amines, polyamines, amides and polyamides known to those skilled in the art. Examples of the retarders include methyl and ethyl esters of low molecular weight alkyl acid ($C_2$-$C_3$) and the esters of the above diluents. Examples of the accelerators include salicyclic, hydroxybenzoic, citric, fumaric, oxalic and maleic acids.

An essential component of the overall composition and process of this invention is the gel breaker. The gel breaker can be selected from three classes depending upon the application temperature, working time, pH concentration limits and contaminants which might be encountered. These three classes include (1) an enzyme type breaker such as cellulase for a substituted cellulose gelling agent, (2) a low molecular weight organic hydroperoxide such as tertbutyl-hydroperoxide or an alkyl hydroperoxide containing about 2 to 18 carbon atoms and a surfactant including both tertiary and quaternary amine, or (3) a combination of an organic hydroperoxide with a cupric ion supplying salt for low temperature applications and/or surfactant containing both tertiary and quaternary amines. The conventional inorganic peroxides do not work with certain combinations of surfactants, coating agents, hardeners and retarders which are frequently necessary for the coating and adsorption properties of the compositions and process of this invention. In addition, certain contaminants can also interfere with the conventional curing agents and some components which may be selected for the compositions of this invention. Some conventional additives can be used such as clay treating additives as described in our copending application Ser. No. 725,068 filed Sept. 20, 1976.

A particularly preferred composition of this invention uses an aqueous HEC gel and a polyepoxide resin composition which can be used over a temperature range of about 100° to 170° F. for a practical application temperature or slightly higher than about 220° F. The preferred aqueous gels as described herein are formulated to produce a working time or to break the aqueous gel within a period of about 1½ to 2 hours. The preferred catalyst or epoxide hardener for use with the preferred epoxy and other additives is methylenedianiline. Other hardeners can also be used as described herein. An accelerator such as salicylic acid is preferred with the methylenedianiline at temperatures of about 140° F. and lower. Amino functional silanes and surfactants are also preferred to promote resin adsorption and coating onto the sand in the presence of the HEC gel. For retarding the curing of the epoxy resin, acetic acid can be used at higher temperatures. Ethyl acetate and higher boiling esters such as ethyl glycol diacetate can also be used. Additional esters which can be used include the methyl esters of acrylic and fumaric acid and similar strength organic acids which have some water solubility and some solubility in the epoxy resin composition. Ethyl glycol diacetate can be used to prolong working time of the methylene dianiline catalyzed resin at temperatures of about 170° F. and above since the diacetate has a boiling point of over about 300° F. while the ethyl acetate ester has a boiling point of about 160° F. The preferred aqueous fluid for dispersing the sand and epoxy resin of this invention can contain from about 2% to 10% and preferably 5% to 10% of an alkali or alkaline earth salt such as the halides and an ammonium halide such as ammonium chloride. In addition, sea water can be used if care is taken to avoid calcium precipitation with some of the components of the system. Salts which can be present in the aqueous gel include sodium chloride, calcium chloride, potassium chloride, calcium bromide, ammonium chloride and buffering agents such as fumaric acid and ammonium carbonate. The aqueous gel is preferably buffered so that the pH is in the range of about 6 to 7 for greater predictability of the gel breaking time and epoxy resin hardening time.

The cationic surfactants and the surfactant blend of this invention should be present in the aqueous fluid in the amount of up to about 1½% or at least a quantity sufficient to coat the silica surfaces of the sand particles and saturate the aqueous gel. Minimum amount of cationic surfactant in the aqueous fluid should be about 1.8 to 2.5 grams of cationic surfactant per 1800 grams of 40–60 mesh sand. An insufficient quantity of cationic surfactant to thoroughly coat the silica surfaces results in loss of consolidation strength of the consolidated pack. Likewise, the blend of cationic to noncationic surfactant is critical in the presence of polymer gelling agents which adsorb or act as colloids in the presence of the silica particles. The surfactant blend should contain at least about 20–25% cationic surfactant and up to about 60% to 75% cationic surfactant or have a preferred ratio of cationic to non-cationic surfactant of about 2 to 3. With the aqueous polymer gelling agent and cationic surfactants present, certain organic phosphate defoaming agents and other similar additives known to be water wetting interfere with the coating action and therefore cannot be used. A silicon type or polypropylene glycol type defoaming agent can be used. Components, steps and conditions which can be used with the compositions and process of this invention in view of this disclosure are disclosed and described in the following references:

U.S. Pat. No. 2,512,338 to Klug et al
U.S. Pat. No. 2,801,218 to Menaul
U.S. Pat. No. 3,100,527 to Hilton, Jr. et al
U.S. Pat. No. 3,123,137 to Young et al
U.S. Pat. No. 3,167,510 to Alter
U.S. Pat. No. 3,199,590 to Young
U.S. Pat. No. 3,416,601 to Young et al
U.S. Pat. No. 3,419,073 to Brooks, Jr.
U.S. Pat. No. 3,424,681 to Stanford
U.S. Pat. No. 3,483,121 to Jordan
U.S. Pat. No. 3,621,915 to Bruist et al
U.S. Pat. No. 3,625,287 to Young
U.S. Pat. No. 3,719,663 to Klug
U.S. Pat. No. 3,776,311 to Carnes et al
U.S. Pat. No. 3,827,898 to Podlas
U.S. Pat. No. 3,898,165 to Ely et al
U.S. Pat. No. 4,000,781 to Knapp
U.S. Pat. No. 4,042,032 to Anderson et al

ARTICLES

Copeland, C. T. and McAuley, J. D.: "Sand Control by the Use of an Epoxy-Coated High-Solids Content Gravel Slurry," SPE 4553, SPE of AIME, Las Vegas, Nev., Sept. 30–Oct. 3, 1973.

Hamby, Jr., T. W. and Richardson, E. A.: "New Sand Control Process Works Well in Dirty Sands," WORLD OIL, June 1968, pp. 81–84.

Knapp, Randolph H.; Planty, Roger; and Voiland, Eugene J: "A Gravel Coating Aqueous Epoxy Emulsion System For Water-Based Consolidation Gravel Packing: Laboratory and Field Application," SPE 6177, SPE of AIME, New Orleans, La. Oct. 3–6, 1976.

Lee, H. and Neville, N.: HANDBOOK OF EPOXY RESINS, "Primary Aromatic Amine Hardeners," Chapter 8, McGraw-Hill, New York, N.Y., 1967.

Lybarger, J. H., Scheuerman, R. F., and Willard, R. O.: "Water-Base, Viscous Gravel Pack System Results in High Productivity in Gulf Coast Completions," SPE 4774, SPE of AIME, New Orleans, La., Feb. 7–8, 1974.

McCauley, T. V.: "Backsurging and Abrasive Perforating to Improve Perforation Performance," J. PET. TECH. (October 1972), pp. 1207–12.

Michaels, Alan S.: "A Low Cost Construction Material," IND. & ENGR. CHEM., Vol. 52[9], (September 1960), pp. 785–688.

Murphey, J. R., Bila, V. J. and Totty, K.: "Sand Consolidation Systems Placed with Water," SPE 5031, SPE of AIME, Houston, Texas, (Oct. 6–9, 1974).

National Burea of Standards: INTERNATIONAL CRITICAL TABLES OF PHYSICS, CHEMISTRY, AND TECHNOLOGY, Vol. VII (McGraw-Hill, 1930), p. 130.

Sparlin, Derry D.: "Pressure-packing Technique Controls Unconsolidated Sand," THE OIL AND GAS JOURNAL, Oct. 18, 1971, pp. 57–62.

Saucier, R. J.: "Considerations in Gravel Pack Design," J. PET. TECH., February 1974, pp. 205–212.

The articles, patents and other references described and cited herein are incorporated herein by reference to the extent necessary.

DESCRIPTION OF CHEMICALS

Epoxy Resins and Hardeners

Epon 828—A Shell Chemical product; an epoxy resin of epichlorohydrin and bisphenol A condensate with a viscosity of about 150 poises. Epon 828 is used where good temperature stability and chemical resistance are desired.

Epon 820—A Shell Chemical resin similar to Epon 828 but diluted with phenylglycidyl ether to lower the viscosity to about 60 poises.

Epon 815—A resin similar to Epon 828 but diluted with a diglycidyl aliphatic ether to lower the viscosity to about 6 poises.

The diluents used in Epon 820 and Epon 815 are both reactive; that is, they will react also with the hardener and lead to a lower molecular weight final product. The diluent used in 820 is additionally a monofunctional reactant, thus it terminates a reacting chain when it reacts. While the diluent in 815 is difunctional, it is essentially aliphatic. Aliphatic epoxies are not generally believed to have the heat stability and chemical resistance of aromatic resin products.

Ciba Araldite 6010 and Celanese EPI-REZ 510 epoxy resins are commercial resins thought to be very similar to Epon 828.

Araldite 6005 is a resin similar to Araldite 6010 but of much lower molecular weight, resulting in a viscosity of about 80 poises. It is apparently not a diluted Araldite 6010.

Shell Hardener F-2—A condensation product of epichlorohydrin bisphenol A and excess ethylene diamine (EDA). The product is described as a resin "adduct" with terminal amine groups.

Shell Hardener F-5—A product similar to F-2 but of higher molecular weight and lower reactivity. Curing times are longer with F-5.

Shell Catalyst Z—An eutetic mixture of primary aromatic amines, methylene dianiline (cl) and meta-phenylene diamine. The aromatic amines are generally thought to require higher temperature of more "active" formulations for cure but lead to products with higher temperature stability than most aliphatic amine cured epoxies. Catalyst Z has been tried up to 160° F.

Ciba 9130 Hardener—A mixture of polyamide curing agents which is a condensation product of diamine and unsaturated diacids.

Versamid 140—A polyamide curing agent condensation product of diamines and unsaturated fatty diacids.

Anchor LO and Anchor LOS Hardeners—Aromatic amine condensation products with fatty acids. The LO product is recommended for room temperature cures, blends of the LO and LOS are recommended for temperatures up to 100° C., at which 100% LOS is recommended. LO contains some salicylic acid.

MDA—Methylene dianiline.

DMP-30—Tri-dimethylaminomethyl phenol (o,o,p) is an epoxy hardener having both amine functional groups and a very acidic hydrogen. It is usually used as an accelerator at lower temperatures. DMP-30D is an ethyl hexanate ester DMP-30 for high temperature applications.

Surfactants

I. This cationic surfactant permitted the coating of epoxy resin onto sand dispersed in HEC gel. It is a di-substituted fatty acid imidazolene or oxazoline with aromatic rings containing nitrogen and oxygen or two nitrogens in the five-membered ring. There is at least one carbon-nitrogen double bond.

II. This is a cationic, nonionic surfactant blend which is a partially quaternized complex polyamine blended with ethoxylated fatty acid in an aqueous alcohol solution wherein the fatty acids contain about 18–20 carbon atoms. See U.S. Pat. No. 3,424,681 to Stanford.

III. This surfactant is a blend of partially quaternary amines and a water-alcohol solution of alkoxy hydroxy alkyl ammonium chloride of $C_{12}$–$C_{14}$ acids with two or more alkyl and alkoxy groups having 1–4 carbon atoms.

IV. This surfactant is a sodium salt of a $C_{12}$ unsaturated fatty acid.

V. This is a cationic quaternary amine surfactant blend of alkyl aryl sulfonic and fatty acid salts of fatty acid amino acids with ethoxylated resinous polyester in alcohol and aromatic solvents.

VI. Cationic quaternary amine surfactants made from a "heavy" crude stock.

VII. This surfactant is a polyamine with some quaternary character used in road tar applications with a molecular weight of about 2,000.

VIII. This surfactant is an alcohol-hydrocarbon solution of a mixture of an alkyl ammonium chloride and dialkyldimethyl ammonium chloride where the alkyl radicals are $C_{16}$–$C_{20}$ unsaturated fatty acid residues.

IX. This surfactant is an alcohol-water solution of dimethyldicocoammonium chloride quaternized.

X. 15-N—An alcohol solution of alkyl-aryl quaternary amines.

XI. This surfactant is an aromatic solution of amines, nonionics, fatty acids and acetylenic alcohols that are not quaternized wherein the fatty acid and alkyl groups contain about 8–20 carbon atoms.

XII. This surfactant is a polyethylene amine with a molecular weight of about 8,000.

Coupling Agents

Silane A-1120—A Union Carbide product; n-beta-(amine-ethyl)-gamma-aminopropyltrimethoxy silane.

Silane Y-5163—A Dow Corning product;

Silane A-187—A Union Carbide product;

Breakers

Enzyme—An oxidase enzyme breaker used below 120° F. Used in a 1.0% aqueous solution unless indicated otherwise.

SP—Sodium persulfate ($Na_2SO_5$) which can be generally substituted for ammonium persulfate (AP) [$(NH_4)_2SO_5$].

TBH—t-butyl hydroperoxide [$(CH_3)_3$-C-OOH] is miscible in water up to about 70% by weight.

TESTING CONDITIONS

Break Times

Break times were determined with a standard 80-pound per 1000 gallon HEC gel (prepared using synthetic sea water containing 2% by weight of NH$_4$Cl heated to the indicated temperatures. These times, for most downhole applications, can be expected to be somewhat longer since the gels are pumped at fast rates. Warm up of the gels from surface to formation temperatures is therefore delayed until after placement in the formation. However, even in 220° F. formations it has been calculated that the temperatures of the gel will not reach 170° F. at the time it reaches the formation. The formations in many cases, may have been cooled by loss of large volumes of fluid thereto prior to placing the resin-sand-gel slurry. Placement of slurry and its composition must be engineered to take variables such as this into account. Gel breaker action is retarded in epoxy resin-sand gel slurry as compared to its use in neat gel.

Resin-Sand Ratios

A recommended resin composition to sand ratio is ¾ gallon per sack (100 lbs.) of sand (lower limit 0.4 gallon/sand and upper limit dependent upon purpose, e.g. plug back). Adequate resin is that sufficient to coat the sand and to give adequate consolidation strengths. The curing agent, accelerators, and retarders should be added to the resin just prior to use. Thorough mixing of sand, gel and resin is required.

Resin Coating Tests

For most tests, an 80 lb./1000 gal. HEC gel was made by adding 20 grams KCl and 9.6 grams HEC to one liter of tap water. The surfactant being evaluated was then added to the gel, usually 1% by volume. Then 40-60 mesh Ottawa sand was added. For these initial tests, 100 grams of sand and 100 cubic centimeters (cc) of gel (with surfactant added) were used (about 8 lbs/gal). Then 10 cc of whatever resin formulation was being evaluated was added next and stirred in well (about 1.25 gal/sack of sand). The results were then observed, as recorded. Two tests were run in which the resin was added to the gel prior to the sand.

Suitable Waters For Preparing Water Gels

Filtered fresh, bay and sea waters with additional salts added may be used in preparation of the HEC gels. Five to ten percent NaCl, 2% KCl and 2% NH$_4$Cl have been found suitable, particularly when these salts were added to a synthetic sea brine.

Pack Sands

The pack sands recommended for other consolidations can be used with the 20-40 and 40-60 mesh sizes being favored. Higher compressive strengths can be expected using the smaller pack sands.

Consistomer Tests

A working time of about two hours at the temperature of application was developed. This was done by testing the working time of the resin, sand and gel (a 12.5 lbs/gal slurry was actually used) in a cement consistometer.

The gel was initially made by mixing tap water, the various salts and then the HEC in a Waring Blender. The sea salt mixtures plus the ammonium chloride generally gave a pH of about 6.8, which allowed about 15 minutes at room temperature for mixing. Thus for most tests, it was not necessary to repeatedly buffer the solution.

Consistometer Tests

A standard gel formulation was used for most of the tests. This was a 2% KCl tap water solution gelled with 80 lbs/1000 gal of HEC (9.6 g/liter). The standard proportions of materials used per test were 250 cc of the base gel, 450 g of 40-60 mesh Ottawa sand (approximately 15 lbs/gal of carrier) 45 cc of resin-hardener mixture (approximately 1.25 gal resin/sack of sand). The resin components were weighed out in the formulation. Stock solutions (1 Molar and 0.1 Molar) of FeCL$_3$, CuCl$_2$ and TBH were made and the concentration of the final gel was determined from approximate dilution of these solutions in the 250 gel mix. The surfactant was generally added 1% by weight to the resin and 0.4% by volume (1 cc in 250 cc of gel) in the carrier fluid. The final slurry volume of the above mixture approached 650 cc, enough to fill the consistometer cups above the paddle top.

The consistometer was heated at its maximum rate, approximately 3° F./minute. Thus, the 150° F. test temperature used for most tests was reached within 30 minutes. The contents were stirred continuously during this time and for an additional one and one-half hours, then the gel was observed and test consolidation was made using the slurry in the cup. These test consolidations were then cured two days at 160° F. Consistometer working time tests at 120° F. and at 180° F. were heated at the same rate and the consolidations made from the resulting slurry were cured at 120° F. and 180° F. respectively.

Tests were terminated when the indicated stirrer torque rose 3 units above the minimum recorded for the test, or after two hours. Gel breaking had little effect on the indicated cup viscosity reading; tackiness of the resin coated sand entering a "B stage" cure was the cause of indicated torque increases. Thus, the maximum pump or working times recorded for those tests of less than two hours are the maximum working time of the resin at those conditions. Variations in the gel formulations will have little effect on the resin working life time.

| Resin Formulations: | | |
|---|---|---|
| Resin Formulation | Chemical On Material | Parts by Weight |
| A (Basic or Standard) | Epon 828 Resin | 112.5 |
| | Ethyl Acetate | 37.5 |
| | Methylene dianiline | 31.0 |
| | Silane A-1120 | 1.5 |
| | Surfactant II | 1.0 |
| B | Resin Formulation "A" and Glacial Acetic Acid | 10.0 |
| C | Resin Formulation "A" and Salicyclic Acid | 1.5 |
| D | Resin Formulation "A" and Salicyclic Acid | 3.0 |
| E | Resin Formulation "A" and Ethylene Glycol diacetate for temperatures above about 160° F. | 100.0 |
| F-5 | Epon 828 | 135.0 |
| | Ethyl Acetate | 15.0 |
| | Silane A-1120 | 1.5 |

-continued

Resin Formulations:

| Resin Formulation | Chemical On Material | Parts by Weight |
|---|---|---|
| | Surfactant II | 1.0 |
| | Shell Hardener F-5 | 60.0 |

Basic Gel Formulation And Component Ratios:

| Components | Parts By Weight | Comments |
|---|---|---|
| Water | 1000.0 | Adjust pH to below 7 with fumaric acid |
| HEC | 9.6 | Stir until gel is formed (80 lbs/1000 gal. gel.) |
| Surfactant II | 4.0 | |
| Breaker Chemicals (for each example) | | |

The breaker chemicals are not added until the resin and sand has been blended with the gel. The system is workable with the sand and resin added in any order; however, the addition of said first has been the preferred upon the appearance of the resulting slurry. Unless otherwise indicated, Formulation A gel (or an 80 lb./1000 gal.) was used for the tests.

GEL FORMULATIONS

Gel Formulation "A"

Same as Basic Formulation above.

Gel Formulation "B"

Forty-three grams of synthetic sea salt was added to the tap water and stirred in before adding the HEC in Formulation "A." Surfactant was added after formation of the gel.

Gel Formulation "C"

Twenty grams of potassium chloride was added to the tap water before addition of the HEC. Formulation was otherwise similar to that in "A".

Gel Formulation "D"

Twenty grams of ammonium chloride was added to the tap water as well as forty-three grams of sea salt (Formulation "B").

Gel Formulation "E"

Forty-three grams of sea salt and twenty grams of ammonium chloride were added to one liter of tap water. Then 0.2 gram of fumaric acid was added to the solution, lowering the pH to about 3. Following this, 9.6 grams of HEC was dispersed in the solution (on a Waring Blender) and the pH was brought back to 7 by adding $(NH_4)HCO_3$. This solution then gelled in about fifteen additional minutes. Four cubic centimeters of Surfactant II was added to the mix after gelation.

Gel Formulation "P"

A gel was prepared similar to Gel Formulation "D"; that is, both sea water and ammonium chloride were added to tap water, then HEC and Surfactant II were added. Following gelation, 20 cc of a phosphate buffer solution was added to the liter of gel. The phosphate buffer was 0.5 M $Na_2HPO_4$ and 0.5 M $NaH_2PO_4$. This solution gave a pH in the 6.5 range, but precipitation of calcium phosphates led to a lower pH than expected.

Gel Formulation "HA"

A gel was prepared similar to Gel Formulation "D"; that is both sea salt and ammonium chloride were added to tap water, followed by HEC and Surfactant II. Following gelation, 20 cc of an acetate buffer solution was added to a liter of gel. The acetate buffer solution was a 0.5 M NAOAC and 0.5 M HOAc mixture, with a buffered pH of about 4.8. This solution was used following recognition of the calcium phosphate precipitate problems for some of the later tests.

CONSOLIDATION TESTS

In all of these tests, the gel was usually mixed by the liter, then after addition of the buffer and Surfactant II, the gel was taken in 300 cc portions, blended with 450 grams of 40–60 mesh Ottawa sand, then 30 cc of resin added (about ¾ gal. resin per sack of sand) and stirred well before adding the breaker chemicals. About 600 cc of this slurry would then be put in a consistometer cup and the remainder in a 6 ounce (oz.) capped bottle. The bottle was put directly into the temperature bath and observed for gel breaking in the course of the test. The consistometer cup was put in a room temperature consistometer, and the temperature was raised at a rate of 3° F. per minute to the final temperature of the test (also the temperature of the bath containing the capped bottle). The consistometer was watched for any sharp increases in viscosity for a period of up to two hours, at which time the cup was opened, the slurry poured (not packed) into a consolidation tube, and the tube put into the hot water bath of the same temperature. Infrequently the gel was found to have broken in the consistometer cup while not doing so in the capped bottle. This was attributed to constant stirring in the consistometer.

Gel Breaking and Sand Consolidation Tests, 100° to 120° F.

For these texts, resin formulation "D" was used, after early tests with formulation "F-5." The gel formulation was also "D," except in a few cases where formulations "P" and "HA" were used. The reported pH usually resulted from the use of the buffer. In other cases, excess HCl or NaOH was added to adjust the apparent pH.

Gel Breaking And Sand Consolidation Tests, 120° to 140° F.

For these tests, reins formulation "C" as used. In addition a combination of the best concentration of enzyme for 120° F. and the best concentration of $CuCl_2$ and TBH at 140° F. was used. The formulation was checked over the range and appeared to give fairly consistent rapid breaks. The gel tested was generally "D."

Gel Breaking And Sand Consolidation Tests, 140° to 150° F.

For these tests, no accelerator or retarder was used in the resin formula (Formula "A"). Break times with the cupric chloride and TBH proved to be similar at 150° F. and 140° F., and so the same concentration of the two was used in several tests, though the enzyme used at lower temperatures was left out, and this probably resulted in the similarity of break times.

Gel Breaking And Sand Consolidation Tests, 150° to 170° F.

For these tests, some glycol diacetate, Formulation "E" was used. Most of these tests were run with Resin Formulation "A" or "B." The testing of the "B" formulation at the lower temperatures indicates that while the working time is extended when the acetate ion is released, the final product of a consolidated sand is obtained.

Compressive Strength Tests

When the samples appeared to be coating well in some of the coating tests, one cubic centimeter of breaker solution (either 0.1 M TBH or 10% SP solution) was added to the 100 cc slurry, and the mixture poured into a consolidation tube (no packing). These were then put into 120° F. and 160° F. baths, and tested for compressive strength a day later.

TEST RESULTS

Initial work with the Shell F-2 and F-5 hardeners gave good strengths at 100° F. to 120° F. However, the catalyst seemed too hot, as the mixes were stiffening in 1½ to 2 hours. After addition of acetic acid to retard the resin cure, which was successful, the breaker system became quite erratic, the acetic acid apparently taking the enzyme breaker to the lower limit of its pH range. Tests run with $CuCl_2$ and TBH at 120° F. broke well at this time.

Tests run with the F-5 at 130° F. and 140° F., after addition of the acetic acid, broke predictably. Methylene dianiline was used over the entire temperature range.

The results indicate that the cupric ion works with the surfactant and the TBH. Break time with TBH, surfactant and no copper are dependent upon the amount of TBH present and the surfactant. Any slight addition of cupric ion to these solutions will increase the rate of breaking of the gel dramatically. Break times with SP breaker (sodium persulfate) were inhibited by the surfactant blend. Slight addition of copper did accelerate the break, though not as dramatically as it does for the organic hydroperoxide system (TBH). The highly acid nature of the Shell F-2 and Shell F-5 hardeners combined with the acetic acid caused a problem with the breakers. Buffer was added to the gel system (a $Na_2HPO_4NaH_2PO_4$ blend) to adjust the pH to the nearly neutral range. The phosphate buffer system was then retained for the higher temperature tests. With sea waters phosphate buffer in such a system became a problem.

The catalyst was changed for temperatures above 140° F. to methylene dianiline. The same catalyst can be used all the way down to 100° F. provided an accelerator is used. The accelerator was tested up to 140° F. At 140° F. it shortens the working time to one hour. It became apparent that the pH was having an effect. It suggests that the pH should be in the range of 6.5 or less. The reason for this is not certain; however, several explanations are possible. The precipitation of $Cu(OH)_2$ becomes imminent at pH 7; the t-butyl hydroperoxide might be ionized in basic media; or the cationic surfactants might be salted out near the neutralization point. In any event, the predictability of the break of the gel is better at a pH of about 6.5 or less. The break will be slightly longer at pH 6.5 than at 6.0. The need for increased surfactant in the 140° F. range was noted. Thus, the recommendation is 0.45–0.5% in the gel. The explanation for the mechanism of the $Cu^{++}$, Surfactant II, and TBH synergism is not completely clear. However, the following observations were made.

The TBH tends to salt out other components in the solution, or its use leads to a lower temperature at which the overall solution becomes cloudy, that is, lower consolute temperature for the nonionic component of Surfactant II. The cationic portion of the surfactant presumably is then solubilized in the micelles (cloudy portion) above this temperature up to a point of about 170° F. Above this point, the organic phase appears to separate in the solution which remains cloudy white. The darker organic material phase collects at the top of the solution. This is presumed to include the cationic material.

Addition of $CuCl_2$ to the solution of TBH and Surfactant II above the cloud point perceptibly darkens the solution, while addition of more TBH lightens the solution but increases the turbidity. This is interpreted to mean that the TBH increases the cationic portion solubility in the micelles while the cupric ions increases its concentration in the bulk phase by complexing it. However, all three must be present for the breaking of the gel at low temperatures. Little synergism has been noted in solution below the cloud point of the system. Thus, while it is apparently the cationic which accelerates the breaker, it is the nonionic surfactant which determines the lower cloud point.

EXAMPLE 1

A 5% NaCl brine was made adding 5 grams of NaCl to 100 cc of tap water. To this was then added 1 cc of the surfactant being evaluated and then 100 grams of 40–60 mesh Ottawa sand while thoroughly mixing with an electric stirrer. After thorough mixing, the stirrer was stopped and the sand was visually examined to see if the surfactant had coated it. Following this, stirring was resumed and 10 cc of an epoxy base resin (Shell Epon 828) was added to the mixture. The stirring was run for an additional three minutes, then stopped and the sand examined again.

| Surfactant Tried | Surfactant Coating | Epoxy Resin Coating |
|---|---|---|
| VIII | Yes | No |
| IX | Yes | Yes |
| X | Yes | Yes |
| I | Yes | Yes |
| VII | Yes | Yes |

The above results suggests that cationic surfactants in general will coat sand in the presence of water (all of the above are cationics). Further, the implication is that most of these will promote epoxy coating in the presence of water. The major difference between VIII, IX and X is that the later two are more strongly cationic.

EXAMPLE 2

Next a series of more strongly cationic surfactants was evaluated, particularily with regard to the coating of the epoxy resin onto the sand. The procedure used was similar to that described for Example 1. In this case, however, a gel was made by adding to the water after the salt 0.96 gram of an HEC (hydroxyethylcellulose) and allowing the material to stir for one hour. Following this, 1 cc of a 1% wt. solution of an enzymatic breaker solution was added, and the gel was set aside until it had broken; that is, the viscosity was 3 or lower. Then 1 cc of each surfactant being tested was added to the solution, followed by the sand, and finally the resin in the same manner as described for Example 1.

Earlier tests indicated that surfactants which did not successfully promote adsorption of the epoxy resin onto sand in the presence of the broken gel did not promote adsorption onto sand in the presence of the gel itself. A few surfactants were found which appeared to work adequately in the presence of the broken gel, but not in the actual gel itself.

| Surfactant | Coating Observations |
|---|---|
| IV | Poor to medium |
| V | Poor |
| VI | Poor |
| II | Excellent |
| XI | Good to Excellent |
| XII | Poor |
| III | Good to Excellent |

The above tests were repeated using variations of the formulation of the Surfactant II. This surfactant is a blend of cationic and nonionic parts with small amounts of anionic impurities being present in the nonionic portion. All of the surfactants shown above are cationics, generally polycationic surfactants.

| Surfactant Ratio Cationic Portion To Nonionic Portion | | Observed Coating Onto Sand in Water With Broken Cellulose Gel | Compressive Strength of Final Consolidation Made, psi |
|---|---|---|---|
| 1:3 | | Poor to Fair | 590 |
| 2:3 - | II | Good to Excellent | 420 (no silane) |
| 2:3 - | II | Good to Excellent | 1568 (Silane A-1120) |
| 1:1 | | Good to Excellent | 410 |
| 2:1 | | Good | 320 |
| 0:1 | | Good | None |
| | IV | poor | No strength |
| | V | Poor | No strength |
| | XI | Good to Excellent | 300 (no silane) |
| | XI | Good to Excellent | 839 (Silane A-1120) |
| | III | Good to Excellent | 775 (Silane A-1120) |
| | I | Good | 442 (Silane A-1120) |

These examples indicate that more than just a cationic surfactant is required for coating epoxy resin onto sand, and that further, good final strengths of adsorbed resin-sand contact is dependent upon some other characteristics, not just the apparent coating of the surfactant onto the sand.

The consolidations described were made in the following manner. A mixture of Epon 828, Shell Hardener F-5, and the surfactant being tried were added to the sand in the coating tests (pbw 100 Epon 828; 35 F-5; 2 surfactant). After apparently coating the sand, the slurry was poured into a test tube which had previously coated with mold release agent, and the tube was put into a 120° F. water bath overnight. After 24 hours cure, the test tube was broken and the consolidated sands were tested for compressive strength.

Observations suggest that another characteristic of a successful coating of the epoxy resin onto sand is reduced dispersibility of the resin in water. That is, the surfactant and resin both tended to gather together into larger particles and adhere longer on the sand during coating tests in the case of the "poor" results, giving the sand an uneven coating appearance due to lack of spreading or leveling. The free cationic materials alone, for example the Surfactant II, while they do promote coating in the presence of water, also result in a very fine even dispersion of the resin in the water phase. The epoxy resin without the amine additives does not have good dispersibility in water. Emulsions are to be avoided.

Addition of the nonionic slightly anionic surfactant to the cationic portion of Surfactant II is seen to substantially improve the final consolidation results even though it does not materially improve the evenness of the surfactant and resin coating onto the sand. It is thought that the additional surfactant may effectively remove the cationic portions from the water-epoxy resin interface and thus reduce this contribution to better dispersion of the resin in water.

The Surfactant VI material is a resinous material with substantial amine addition to form the surfactant. Most of the other material is the amine adducts of polyfunctional unsaturated surfactants which were then quaternarized. Surfactant II is a blend as described above. The cationic portion consists of a suitable hydrophobe and a hydrophilic end, usually a carboxylic acid to which has been added several (2 to 10) moles of ethylene oxide. The resulting OH groups appendent to the ethyloxated portion of the molecule were then reacted with triethylene diamine on a stoichiometric basis (or nearly so), forming both a quaternary amine and an appendent tertiary amine. The cationic portion of Surfactant I consists of a hydrophobic group and the hydrophilic group which is a quaternarized imidazoline.

EXAMPLE 3

Cellulose gels are used in several different applications in the oil industry; for example, as carrying fluids in sand packing and in fracturing. In these two instances, it is desirable to break the gel latently after it has served its purpose in transporting the solids into place. This is done presently by one of several methods. The pH of the gel may be lowered either by direct addition of acid or by addition of an acid forming material, so that the acid is formed later under downhole conditions of heat and time. This method is usually used only at temperatures around 200° F. and above, due to the volume of acid required at lower temperatures. Another method is to add an enzymatic breaker to the gel. This method works well with some cellulose gel at temperatures up to about 140° F., and preferably only only up to 120° F., as the enzymes are denatured at higher temperatures and lose their effectiveness. A third method is to add an oxidizing material. This method is particularly favored in the range from 120° F. to 200° F. and some of the oxidizing agents which have been used are sodium and ammonium salts of persulfate and various organic peroxides and hydroperoxides including t-butyl hydroperoxide (TBH).

The oxidizing breakers have certain faults however which limit their use. A principal one is their incompatibility with chemicals which might be more easily oxidized than the cellulose gel, for example, $Br^-$ in concentrated solution or tertiary aromatic amines which might be present in surfactants, clay-treating compounds or other additives to the gel. An example of such an additive is the amine curing agent used in some of the epoxy resins described in subsequent examples. However, the utility of this part of the invention is not limited to its use in combination with the epoxy resin coated sands.

For the following tests, an HEC gel was made up in the following manner. To one liter of tap water was added 41 grams of synthetic sea salt and 20 grams of NH4Cl and 9.6 grams of the HEC material described in Example 1. The solution was stirred for 30 minutes at which time it had completely gelled. At this time the gel was split into 100 cc portions and the additives tested by adding the indicated amount to a portion and putting the gel sample into a 160° F. water bath. The gels were considered broken when the viscosity gel below 10 cps measured on a Fann 35 viscometer at 300 rpm. The starting viscosity was 219 cps at 80° F. and 160 cps at 160° F.

| Breaker Added | Concentration Breaker $\times 10^{-3}$g | Additive Tested, in cc's | Time to Break |
|---|---|---|---|
| SP | 1,000 | none | 20 minutes |
| AP | 1,000 | none | 20 minutes |
| TBH | 1,000 | none | 4 hours |
| TBH | 100 | none | 20 hours |
| SP | 1,000 | Surfactant XII | Did not break |
| SP | 1,000 | CaBr$_2$, 5 g | Did not break |
| SP | 1,000 | Shell F-5, 5 g | Partial break in 3 hours |
| SP | 1,000 | Shell F-5, 5 g | 2 hours |
| SP | 1,000 | MDA, 5 g | Did not break |
| TBH | 100 | Shell F-5, 5 g | Partial break in 20 hours |
| TBH | 100 | MDA, 5 g | No break in 44 hours |
| TBH | 100 | CaBr$_2$, 5 g | Did not break |

The above data indicates the incompatibility of the sodium persulfate and ammonium persulfate breakers with some additives which might be added to HEC gels. The Surfactant XII is a polymer sometimes added for sand or clay treating in drilling fluids and in both sand packing and fracturing. The CaBr$_2$ is used to increase the density of the gel when used in certain high pressure well treating steps. Shell F-5 and methylene dianiline are epoxy resin hardeners. The oxidative breaker oxidizes the additive rather than the cellulose gel, thus delaying or preventing the gel break.

EXAMPLE 4

While the persulfate breakers and the organic peroxide breaker were ineffective in breaking the gels under some circumstances above, it has been found that these solutions can be broken predictably using combinations of the organic hydroperoxide, a transition metal and an amine complex.

| Breaker and Concentration Used, $\times 10^{-3}$ g | | Additive Tested (1 cc per 100 cc gel) | Break Time |
|---|---|---|---|
| TBH | 1,000 | CaBr$_2$ | Did not break |
| TBH | 1,000 | None | 4 hours |
| TBH | 1,000 | None | |
| Surfactant II | 400 | | 2 hours |
| TBH | 1,000 | | |
| Surfactant II | 400 | None | 1 hour |
| CuCl$_2$ | 1.7 | | |

These tests were run at 140° F. The gel was parts by weight tap water 1,000; sea salt 41; NH$_4$Cl 20; HEC 9.6. The concentration of the breakers and additives given above are on the basis of 100 cc portions (roughly 100 grams) of the above gel.

Thus a synergistic effect can be seen by the combination of these three elements for breaking the HEC gels. Furthermore, it is shown that this combination is effective in breaking gels with some of the additives shown previously which could not be broken predictably using the inorganic peroxide breakers.

| Additive | Break Time |
|---|---|
| CaBr$_2$ (20% by weight in the gel) | 80 minutes |
| None | 90 minutes |
| Surfactant XII (1% by weight in the gel) | 90 minutes |
| Shell F-5 (1% by weight in the gel) | 90 minutes |

The above tests were again run at 140° F. using a gel similar to that described in the example above. In this case, the breaker was added directly to the one liter of gel made the proportions being (pbw) tap water 1,000; sea salt 41; NH$_4$Cl 20; HEC 9.6; TBH 3.3; Surfactant II 0.4; Cucl$_2$ 0.57.

A problem arises in the use of epoxy resins in oil field applications. In some cases, the working time for formulations is not great enough. That is, that while the formulation is suitable and laboratory tests give consolidations of suitable strengths and permeabilities, the mechanical problems associated with pumping and placing the resinous material while it is still in a low viscosity liquid state require longer amounts of time than the resin will remain workable at such elevated temperatures. For example, a few resin consolidation jobs are run in the industry at ¼ barrel per minute (bpm) using 4" tubing, a standard tubing. This means that 200 minutes would be required to pump the resin to 4500 feet at such rates. The tubing size and the pumping rates can be varied from this extreme case; however, it can be seen that the problem of treating 10,000 feet deep formulations where the bottom hole temperature approached 220° F. can easily mean longer than practical working times.

This problem could arise either in the in situ consolidation of formation sand, in placing a resin plug or water shut-off, or in the placement of resin coated sands for formation of sand screen near the perforation or production area of the well. The problem relates to the resin formulation itself and not to the placement fluids, whether oil or water, and not to the technique or intent of the application.

An associated part of this problem lies in estimation of the final treating temperature (not necessarily the formation bottom hole temperature). That is the problem of selecting a temperature too high and formulating the resin for the longest possible working time at that temperature when the actual temperature is much lower than the supposed temperature. In this case, the final resin cure time will be greatly extended, as this is also a function of the environmental temperature, possibly to the extent that the well may be inadvertently produced or other flow induced before the resin had hardened, leading to an obvious failure in the job of whatever type.

The need then is for resin formulations with the broadest range of application temperature limits, yet still having sufficient working time in the upper regions of such ranges and rapid enough cure in the lower ranges. These limits are determined by the type of treatment and the conditions and cannot necessarily be sharply defined.

An acid such as acetic acid will retard the cure of amine cured epoxy resins. Thus, it is possible to extend the working time of such resins at elevated temperatures, though this approach has the definite failing of extending the working and cure times at lower temperatures. The use of an ester of an acid overcomes this defect at the lower temperatures. By choosing an ester with a hydrolysis rate which is temperature dependent, the acid concentration is controlled. At higher temperatures where the rates of hydrolysis of the ester is greater, the acid is produced in sufficient quantity to retard the resin thickening time and thus extend the working time of the epoxy resin. At lower temperatures, the rate of hydrolysis of the ester is such that most of the amine is fully reacted with the epoxy before much free acetic acid is released.

Resin Gel Time Tests

| Resin Formulation (pbw) |  | Temp. °F. | Gel Time Minutes |
|---|---|---|---|
| Epon 828 | 112.5 | — | — |
| MDA | 31 | — | — |
| Silane A-1120 | 1.5 | 80 | >600 |
|  |  | 100 | >360 |
|  |  | 140 | 120 |
|  |  | 150 | 90 |
|  |  | 160 | <45 |
|  |  | 180 | <20 |

TABLE 1

Various Gels With Epoxy-Water Gel Formulations

| Gel and Concentration, Lbs./1000 Gal. 2% KCl |  | Gel Type | Observations |
|---|---|---|---|
| Substituted Guar | 80# | Propyl adduct of guar gum | Results similar to HEC gels, but somewhat lower strengths in final consolidations. |
| HEC | 80# | HEC, ethylene oxide substituted | Standard for all tests reported. |

TABLE 2

Effect of Various Components in Epoxy Formulation On Oxidative Breakers of HEC Gel at 160° F.

| Test No. | Component Added To HEC | Gel Breaker (0.1 M) | Observations |
|---|---|---|---|
| 1 | None | TBH | Fairly complete break in 20 hours. |
| 2 | Epon 828 + 10% EtOAc | TBH | Did not break in 44 hours. |
| 3 | EtOAc | TBH | Broke in 20 hours. |
| 4 | Shell F-2 Hardener | TBH | Separated in a broken and unbroken gel in 20 hours. |
| 5 | Surfactant II | TBH | Broke in 6 hours. |
| 6 | Silane A-1120 | TBH | Broke in 20 hours. |
| 7 | Surfactant III | TBH | Broke in 20 hours. |
| 8 | Anchor LOS Hardener | TBH | No break in 44 hours. |
| 9 | Shell Catalyst Z | TBH | No break in 44 hours. |
| 10 | Versamid 140 | TBH | No break in 44 hours. |
| 11 | Surfactant I | TBH | No break in 44 hours. |
| 12 | None | SP | Break in 20 minutes. |
| 13 | Epon 828 (no EtOAc) | SP | Break in 20 minutes. |
| 14 | Shell Hardener F-2 | SP | Partial break in 3 hours. |
| 15 | Surfactant II | SP | Poor break in 20 hours. |

The tests were run using 100 cc of standard HEC gel, either 5 cc of a diluted TBH solution 0.1 M or 1 g of sodium persulfate (SP) and 5 cc of the epoxy additive or surfactant being tested. The tube was then put into a 160° F. bath.

TABLE 3

Interactions of Surfactants With HEC Gel Breakers

| Surfactant | Breaker | Temp. °F. | Observations |
|---|---|---|---|
| I | SP, AP | 160 | No break, using recommended quantity. |
| II | SP, AP | 160 | No break using recommended quantities. |
| IV | SP, AP | 160 | No break using recommended quantities. |
| II | Enzyme | 120 | Broke in 24 hours using recommended amount. |
| IV | Enzyme | 120 | Broke in 24 hours using recommended quantities. |
| VI | Enzyme | 120 | Broke in 24 hours using recommended quantities. |
| XI | Enzyme | 120 | No break in 24 hours using recommended quantities. |
| II | TBH | 160 | Broke in 20 minutes. |
| XI | TBH | 160 | Broke in 20 minutes. |
| IV | TBH | 160 | Similar conditions to two cases above. However the gel did not break. |

The 80 lbs./1000 gal. HEC gel was made by adding 20 grams KCl and then 9.6 grams HEC to tap water in a Waring blender. After gel formation, the sample was split into 100 cc portions, and 1 cc of trial surfactant added to each job. Finally, the recommended quantity of breaker was added to each 100 cc portion and the jars were capped and put into the proper water bath for observation. Recommended quantities per 100 cc are: 3.5 mg of enzyme at 120° F.; 18 mg of SP at 160° F.; and 18 mg of AP at 160° F. These were added by dissolving 1 gram of breaker in 100 cc of tap water, then adding the necessary amount of solution.

TABLE 4

TBH Breaker Effectiveness On HEC Gels[a] Following Addition of $CuCl_2$ and Surfactant

| Test No. | Additives Besides TBH | Test Time In Hrs. | Viscosity In Centipoise |
|---|---|---|---|
| Tests at 140° F. | | | |
| 1 | $CuCl_2$ present; no Surfactant II | Start | 138 |
| 1 | | 1 | 124 |
| 1 | | 1-½ | 94 |
| 1 | | 2 | 78 |
| 1 | | 3 | 56 |
| 1 | | 4 | 20 |
| 2 | $CuCl_2$ and Surfactant II | Start | 138 |
| 2 | | ½ | 95 |
| 2 | | 1 | 35 |
| 2 | | 2 | 31 |
| Test at 130° F. | | | |
| 3 | $CuCl_2$ present; no Surfactant II | Start | 144 |
| 3 | | 1 | 113 |
| 3 | | 3 | 99 |
| | At this point 0.5% Surfactant II was added to #3 | | |
| 3 | | 3-½ | 36 |
| 3 | | 4 | 14 |
| 3 | | 4-½ | 14 |

[a]Gel: 20 grams KCl, 9.6 grams HEC, 1 liter tap water
TBH: .001 M all tests
$CuCl_2$: $1.25 - 10^{-3}$ g/l, all tests.

TABLE 5

Breaks Of 80 Lbs./1000 Gal. Of HEC With $FeCl_3$, TBH and Surfactant At 120° F.

| Test No. | Conc. of TBH Molar × 0.0001 | Conc. of FeCl Molar × 0.0001 | Conc. Surfactant cc's /100 cc | Time at 120° F. Hrs. | Viscosity 300 RPM Fann |
|---|---|---|---|---|---|
| 1 | — | — | — | Start | 125 |
|   | — | — | — | 12 | 109 |
|   | — | — | — | 36 | 97 |
| 2 | — | — | 0.5 | Start | 125 |
|   | — | — | 0.5 | 12 | 67 |
|   | — | — | 0.5 | 36 | 47 |
| 3 | — | 1.25 | — | Start | 125 |
|   | — | 1.25 | — | 12 | 103 |
|   | — | 1.25 | — | 36 | 72 |
| 4 | — | 1.25 | 0.5 | Start | 125 |
|   | — | 1.25 | 0.5 | 12 | 95 |
|   | — | 1.25 | 0.5 | 36 | 55 |
| 5 | — | 5.00 | — | Start | 125 |
|   | — | 5.00 | — | 12 | 55 |
|   | — | 5.00 | — | 36 | 24 |
| 6 | 2.44 | 1.25 | — | Start | 125 |
|   | 2.44 | 1.25 | — | 12 | 31 |
|   | 2.44 | 1.25 | — | 36 | 13 |
| 7 | 2.44 | 2.50 | — | Start | 125 |
|   | 2.44 | 2.50 | — | 12 | 29 |
|   | 2.44 | 2.50 | — | 36 | 14 |

These tests demonstrate that any combination of the surfactant and the metal chloride will not break the gel. They have had to be acting with the TBH.

TABLE 6

Breaker Concentrations for Gelled Water At Various Temperatures

| Temperature Range | Breaker or Breaker Blend | Breaker Concentration Gms/1000 Gms $H_2O$ | cc/1000 Gms $H_2O$ | Break Time Hrs:Min. |
|---|---|---|---|---|
| 100°–120° F. Range | Enzyme | 0.067 | | |
| (a) 100 | | | | 2:0 |
| (b) 110 | | | | 1:30 |
| (c) 120 | | | | 0:50 |
| 120–150° F. Range | Enzyme | 0.033 | | |
|  | $CuCl_2 \cdot 2H_2O$* | 0.55 | | |
|  | TBH | | 3.30 | |
| (a) 120 | | | | 1:15 |
| (b) 130 | | | | 0:45 |
| (c) 140 | | | | 1:10 |
| (d) 150 | | | | 1:00 |
| 150°–160° F. Range | $CuCl_2 \cdot 2H_2O$* | 0.055 | | |
|  | TBH | | 1.67 | |
| (a) 160 | | | | 1:30 |
| 160°–170° F. Range | $CuCl_2 \cdot 2H_2O$* | 0.028 | | |
|  | TBH | | 1.67 | |
| (a) | | | | 1:40 |
| (b) | | | | 1:00 |
| 170° F.–Up | $CuCl_2 \cdot 2H_2O$* | 0.028 | | |
|  | TBH | | 0.84 | |
| (a) 170 | | | | 1:00 |

*For the lab tests, $CuCl_2 \cdot 2H_2O$ was added to the gel as a 0.1 molar solution (17 g/liter). The weight is calculated from that as $CuCl_2 \cdot 2H_2O$. Gel included 0.5% Surfactant II in all tests.

TABLE 7

Various Epoxy Resin Systems Evaluated

| Description of Resin and Hardner System | Compressive Strength in PSI | Observations |
|---|---|---|
| Shell Epon 828, Versamid-140, Surfactant I @ 120° F. with enzyme breaker | 571 | This was a successful formulation. |
| With SP breaker at 160° F. | No Strength | The gel failed to break. |
| With TBH breaker at 160° F. | No Strength | The gel failed to break. |
| Shell Epon 828, Shell F-5, Surfactant I @ 120° F. with enzyme | Soft | The gel appeared to break, apparently catalyst is a higher temperature catalyst. |
| Shell Epon 828, Shell F-2, Surfactant II @ 120° F. with enzyme | 1,121 | This is about the upper temperature limit for the enzyme. |
| Shell Epon 828, Shell F-2, Surfactant II @ 160° F. with TBH breaker | 1,568 | |
| Shell Epon 828, diluted 10% EtOAc, Shell F-2 Catalyst (30 pbw) Surfactant II, | 1,130 | 20–40 mesh sand used for temperature this test; |

TABLE 7-continued

Various Epoxy Resin Systems Evaluated

| Description of Resin and Hardner System | Compressive Strength in PSI | Observations |
|---|---|---|
| 160° F. TBH breaker | | 40–60 mesh sand would presumably been higher, but was unavailable. |
| Shell Epon 820, Shell F-2 catalyst, Surfactant II 160° F. TBH breaker | 794 | This resin includes a monofunctional diluent which lowers the final molecular weight of the product. |
| Shell Epon 815, Shell F-2 catalyst, Surfactant II; 160° F. with TBH breaker | 1,321 | This resin includes a diglycidyl aliphatic diluent which raises its reactivity but is thought to lower the heat stability of the final product. |
| Epon 828, 40% diluted with EtOAc, MDA catalyst, 160° F. with TBH breaker | 955 | |
| Epon 828 diluted with Cyclosol 60, Versamid 140 diluted with Cyclosol 60; 160° F., TBH breaker | No Strength | Emulsion formed, the resin apparently did not completely coat sand. |
| Epon 828, TBH Surfactant II at 150° F.; (30 pbhr) F-2; 0.005 M TBH | 2,500 | Gel broke and resin stiffened within 45 minutes. |
| Epon 828, TBH, Surfactant II at 150° F.; (30 pbhr) F-2; 0.005 M TBH | No Strength | No break, only went to 1 hr 15 min. before resin tacky. |
| Epon 828; DMP-30 (2 pbhr); TBH .001 M; FeCl₃ .002M; at 150° F. | | Gel did not break. Solids did not become tacky and did not harden. |
| Epon 828; DMP-30 10 phwr; TBH 0.001 M; FeCl₃ 0.002 M; at 150° F. | 500 | 1¼ hrs. pot life at 150° F. Gel appeared to break at about same time. Did not set much in 24 hours. |

Gel: 20 g KCl; 9.6 g HEC; in 1 liter tap water.
Surfactant: 0.5% Surfactant II in gel.
Breakers: 0.2 cc/200 cc of gel of TBH.
Temperature: 160° F.
Sand: 100 g/100 cc of gel, 40–60 mesh Ottawa.
Resin: 10 cc/100 g of sand.
Cyclosol: an aromatic solvent.

TABLE 8

Compressive Strengths of 40–60 Mesh Ottawa Sand Consolidated With Various Epon 828 Formulations After 24 Hour Cure at 160° F. in HEC Gel*

| Hardener and Resin | Surfactant | Compressive Strength in PSI |
|---|---|---|
| Shell F-2 (20 pbhwr);** no diluent | I | 482 |
| Ciba 9130 (20 pbhwr); 9% EtOAc | II | 50 |
| Shell F-2 (20 pbhwr); 10% EtOAc | II | 1130 |
| Shell Catalyst-U; 10% EtOAc | II | Soft gel; gel did not break. |
| Anchor LO; 10% EtOAc | II | 70 Gel did not break. |
| Anchor LOS-LO; 10% EtOAc | II | 70 Gel did not break. |
| Shell Catalyst Z; 10% EtOAc | II | 714 |
| Shell Catalyst Z; 10% EtOAc | III | 623 |
| MDA; 10% EtOAc¹ | II | 660 |
| MDA; 10% EtOAc² | II | 555 |
| Shell F-2; no diluent | II | 1571 |
| Shell F-2; no diluent | XII | 200 |
| Shell F-2; no diluent | I | 473 |
| Shell Catalyst Z; 10% EtOAc | III | 623 |
| Shell Catalyst Z; 10% EtOAc | II | 714 |
| Shell F-2; 10% EtOAc | II | 1130 |
| Shell F-2; 10% EtOAc | VII | No strength. The gel did not break and an emulsion appeared. |

*80 lbs/1000 gal. concentration HEC gel of 2% KCl water, t-butyl hydroperoxide with the breaker (0.1% by wt.).
**pbhwr - parts by hundred weight resin.
¹For this test, the resin was added to the 2% KCl water before gelation.
²For this test, the resin was added to the gelled 2% KCl before the sand.

TABLE 9

Retarder Formulations Evaluated For F-5 Hardener

| Test No. | Retarder Formulation | Test Temp. °F. | Consistomer Pump Time Hrs:Min. |
|---|---|---|---|
| 1 | Acetic acid 30% by wt. of F-5 | 150 | 2:00 |
| 2 | Acetic acid 6% by wt. of F-5 | 150 | 0:55 |
| 3 | Acetic acid 6% by wt. ethyl acetate 30% by wt. F-5 | 150 | 1:10 |
| 4 | MDA hardener an equal wt. of ethyl acetate Epon 815 resin | 150 | 2:00 |
| 5 | Similar to #4 above, no EtOAc | 150 | 1:35 |
| 6 | Epon 815 MDA No retarder TBH breaker | 180 | Terminated In 1:00 |
| 7 | Epon 815 MDA 15% EtOAc Added to slurry | 180 | Terminated In 1:30 as EtOAc boiled off. |

The resin formulation was 90 pbw Epon 828; 10 pbw ethyl acetate; 40 pbw Shell hardener F-5; 1.5 pbw Silane A-1120, 1.5 pbs Surfactant II. If retarder was added to the formulation, it was mixed in last, based upon the weight of F-5 used.

The resin formulation for the methylene dianiline tests was 100 pbw Epon 815; 16 pbw methylene dianiline; 1 pbw Surfactant II; 1 pbw Silane A-1120. If retarder was used, it was added to the formulation last. Epon 815 was used rather than diluted Epon 828 in order to show the retarding effect of ethyl acetate, which is in Epon 828.

TABLE 10

Consolidation Compressive Strengths And Gel Break Times Of Tests Run At 100° F. Using Methylene Dianiline Hardener With Enzyme Breaker

| Break Time Hrs:Min. | Consolidation Compressive Strength In PSI | Concentration Of Enzyme In Gms/300 cc of Gel | pH of Gel |
|---|---|---|---|

TABLE 10-continued

| | | | |
|---|---|---|---|
| 1:00 | 2770 | 0.01 | 3.5 |
| Over 4 hrs. | Not Run | 0.01 | 6.2 |
| 2:00 | Not Run | 0.02 | 6.2 (phosphate buffer) |
| 1:40 | Not Run | 0.03 | 6.2 (phosphate buffer) |
| 1:00 | 3480 | 0.04 | 6.2 |
| 0:30 | 2900 | 0.08 | 6.2 |
| *Tests Run 110° F.* | | | |
| Over 2 hrs. | Not Run[a] | 1.0 | 9.0 (estimate) |
| 1:20 | Not Run[a] | 2.0 | 9.0 |
| 1:20 | 1610[a] | 3.0 | 9.0 |
| 1:00 | 1875[a] | 4.0 | 9.0 (estimate) |
| Over 1 hr. | 2750 | 1.0 | 7.0 |
| 1:30 | 3930 | 2.0 | 7.0 |
| 1:20 | Not Run | 3.0 | 7.0 |
| 2:00 | Not Run | 0.2 | 6.2 |
| 1:00 | 1430 | 0.4 | 6.2 |
| 0:30 | Not Run | 0.6 | 6.2 |

[a]- Resin Formulation F-5

Enzyme used as a 1% aqueous solution: the number given in the table is the number of cc of this solution added to 300 cc of gel.

Resin formulation in all tests except those marked "a" used Resin Formulation D, page 30. Gel formulation was that marked "B". Cure time was 24 hours in all cases at the test temperature. The pH of the gels was adjusted with HCl, NaOH or $NaH_2PO_4$.

TABLE 11

Consolidation Strengths And Gel 11 Times[b] Of Tests Run At 130° F. And Using Methylene Dianiline Hardener And TBH With $CuCl_2$ Breakers

| Gel Break Time Hrs:Min. | Consolidation Compressive Strength PSI[c] | Conc. TBH cc/300 cc Gel | Conc. CuCl cc/300 cc Gel | Estimated pH |
|---|---|---|---|---|
| 3+ | 1430[c] | 1 | 1 | 5 |
| 2:00 | 1000[c] | 2 | 2 | 5 |
| 1:20 | 2050 | 3 | 3 | 5 |
| 0:30 | 2850 | 4 | 4 | 5 |
| 1:00 | 1100 | 2 (+ Enzyme)[a] | 0.5 | 5.9 |
| 0:40 | 1050 | 2 (+ Enzyme)[a] | 1 | 5.9 |
| *Tests Run At 150° F.* | | | | |
| 0:20 | 980 | 1 | 1 | 3 |
| 0:30 | 1120 | 0.5 | 0.5 | 3 |
| 0:30 | 980 | 0.25 | 0.25 | 3 |
| 2:00 | 1340 | 2.1 | 1.5 | 5.1 |
| Over 3 hrs. | 1780 | 1.5 | 0.9 | 5.1 |
| 2:00 | 1070 | 2.1 | 1.5 | 6.5 |

[a]Concentration of Enzyme: 0.02 cc of 1% aqueous solution of Enzyme in water per 300 cc of gel.
[b]Gel Formulation D: $CuCl_2$ used as a 0.1 Molar solution.
[c]24 hour cure, 40–60 mesh sands. Resin Formulation B, first two entries, Resin Formulation A for other tets.

TABLE 12

Compressive Strength Development Versus Time For Consolidations At Various Temperatures

| Temp. of Cure, °F. | Resin Formulation | After 8 Hrs., PSI | After 16 Hrs., PSI | After 24 Hrs., PSI |
|---|---|---|---|---|
| 100 | A | Soft | 1560 | 2500 |
| 120 | C | 1790 | 2230 | 2550 |
| 120 | C | 3170 | 4240 | 4910 |
| 140 | C | 5350 | 4110 | 6030 |
| 140 | A | 2732 | 2230 | 2860 |
| 150 | E[b] | 465 | 980 | 2010 |
| 160 | A[a] | 3090[a] | 2900 | 3270 |
| 160 | E | 555 | 825 | 1110 |

TABLE 12-continued

Compressive Strength Development Versus Time For Consolidations At Various Temperatures

| Temp. of Cure, °F. | Resin Formulation | After 8 Hrs., PSI | After 16 Hrs., PSI | After 24 Hrs., PSI |
|---|---|---|---|---|
| 200 | E[c] | 1835 | 1875 | 2320 |

[a]This mixture gave a working time of slightly less than one hour and forty-five minutes.
[b]This formulation is recommended for use only above 160° F.
[c]This formulation can be used for BHST up to 210° F., assuming well preparation and placement techniques maintain the slurry temperature at 160° F. or below until it is placed.

TABLE 13

Sand Consolidation Data, Using Varying Concentrations of Resin Coated Sand In Gelled Water

| Sand Concentration Lbs. Sand/Gal. Gel | Resin, Gal./ 100 Lbs. Sand | Compressive Strength of 20–40 Sand Consolidation, PSI |
|---|---|---|
| 2.5 | 0.75 | 1819 |
| 5.0 | 0.75 | 3045 |
| 10.0 | 0.75 | 4363 |
| 12.5 | 0.75 | 6030 |

The consolidations above were prepared at 140° F. using Resin Formulation C. Consolidation time was 48 hours at 140° F. Strengths were tested after 24 hours.

The process has potential application for fracturing, particularly in unconsolidated formations. These fracturing treatments will normally involve lower sand concentrations in the gelled water carrier than those normally associated with sand control application. The lower sand concentrations did extract epoxy resin (as dispersed in the gelled water carrier in very low percentages) from the gelled water. The quantity of resin dispersed in the gel is dependent on the sand concentration used. A ratio of 0.75 gallon of resin is used per 100 pounds of sand in the gel. Sufficient consolidation strengths can be obtained with low sand concentrations. Increased compressive strengths might be obtained using the lower sand concentrations if the resin-sand ratio was increased from 0.75 gallons per 100 pounds to 1.0 gallons per 100 pounds.

TABLE 14

Compressive Strengths And Permeabilities Of Uncompacted Epoxy[b] Coated Sands Cured 24 Hours At 140° F.

| Ottawa Sand Size Mesh[d] | Compressive Strength In PSI[a] | Permeability In Darcies[a] |
|---|---|---|
| 40–60 | 3941 | Over 180[c] |
| 20–40 | 2380 | Over 180[c] |
| 10–20 | 2890 | Over 180[c] |

[a]Compressive strengths and permeabilities are the averages of three tests.
[b]The gel was a 2% $NH_4Cl_2$ in a sea salt water solution, gelled with 80 lbs./1000 gal. HEC. The gel breakers were the 140° F. formulation calling for enzyme, $CuCl_2$ and TBH. The resin mix was the standard mix with no accelerator or retarder.
[c]Limitations of equipment prevented measurements above 180 Darcies.
[d]15 pounds of sand per gallon of gel.

I claim:

1. An epoxy resin composition for forming a porous permeable consolidated particulate mass, characterized as a mixture of an epoxy resin composition which comprises a polymerizable polyepoxide, optionally an organic diluent and a curing agent; an aqueous gel with a neutral polysaccharide polymer having a molecular weight of about 100,000–2,000,000 and water solubility sufficient to produce a viscosity of at least about 30 centipoise containing a mixture of surfactants comprising at least one cationic surfactant with limited water solubility and at least one noncationic water miscible surfactant which causes the epoxy resin to coat onto silica surfaces of the particulate material in the presence of the polysaccharide gel and which are present in an amount at least sufficient to coat onto said silica surfaces.

2. A composition for filling a voide with consolidatable epoxy resin coated silica particles comprising a mixture of an aqueous fluid gelled with a neutral polysaccharide cellulose polymer having a molecular weight of about 100,000–2,000,000 and water solubility sufficient to produce a viscosity of at least about 30 centipoise; a mixture of surfactants present in an amount at least sufficient to coat onto said silica particles comprising at least one cationic surfactant with limited water solubility and at least one water miscible surfactant which is nonionic, anionic, neutralized cationic or a mixture thereof; said silica particles and an epoxy resin composition.

3. A composition of claim 2 wherein the epoxy resin composition comprises a polymerizable polyepoxide, an organic diluent and a curing agent.

4. A composition of claim 2 wherein the epoxy resin composition contains a retarder and a cationic surfactant.

5. A composition of claim 2 wherein the epoxy resin composition contains a silane.

6. A composition of claim 1 wherein the epoxy resin composition contains a retarder and a cationic surfactant.

7. A composition of claim 6 wherein the epoxy resin composition contains a silane.

8. A composition of claim 1 or 2 containing a gel breaker comprising a glucoside oxidizing enzyme; an organic $C_2$–$C_{18}$ alkyl tertiary hydroperoxide; said organic hydroperoxide with cupric ion and a cationic amine surfactant; or a combination thereof.

9. A composition of claim 1 or 2 in which a breaker is added to said mixture.

10. A composition of claim 9 wherein the breaker is a glucoside oxidizing enzyme, an organic $C_2$–$C_{18}$ alkyl tertiary hydroperoxide, said organic hydroperoxide with cupric ion and a quaternary amine or a combination thereof.

11. A composition of claim 8 wherein the epoxy resin composition comprises an epoxy resin, normally liquid organic diluent and a catalyst.

12. A composition of claim 11 wherein the epoxy resin composition contains an accelerator.

13. A composition of claim 12 wherein the organic diluent acts as a retarder for the catalyst.

14. A composition of claim 13 wherein the epoxy resin composition contains a silane.

15. A composition of claim 14 wherein the epoxy resin composition contains a cationic surfactant.

16. A composition of claim 15 wherein the aqueous gel contains a breaker.

17. A composition of claim 10 in which the cupric ion is supplied by an inorganic salt or a low molecular weight organic compound and the amine surfactant has about 8–18 carbon atoms.

18. A composition of claim 16 in which the retarder comprises at least one organic compound capable of hydrolyzing to produce a low molecular weight organic acid having at least two carbon atoms.

19. A composition of claim 18 in which the organic acid is acetic acid.

20. A composition of claim 18 in which the organic compound is ethyl acetate, ethylene glycol diacetate or a mixture thereof.

21. A composition of claim 10 wherein the epoxy resin composition comprises an epoxy resin, normally liquid organic diluent and a catalyst.

* * * * *

UNITED STATES PATENT AND TRADEMARK OFFICE
CERTIFICATE OF CORRECTION

PATENT NO. : 4,199,484
DATED : April 22, 1980
INVENTOR(S) : Joseph R. Murphey

It is certified that error appears in the above—identified patent and that said Letters Patent is hereby corrected as shown below:

Column 15, line 23, "said" should read --- sand ---.

Column 16, line 42, "texts, should read --- tests, ---.

Column 25, Table 6 of line beginning "160°-170°F. Range" the word in second column reads "$CuCl_2.2H_2O*$" should read --- $CuCl_2.2H_2O*$ ---.

Column 28, last line of footnote to Table 8 reads "hu 2For" should read --- $^2$For ---.

*Signed and Sealed this*

Twelfth *Day of* August 1980

[SEAL]

Attest:

SIDNEY A. DIAMOND

*Attesting Officer*     *Commissioner of Patents and Trademarks*